UNITED STATES PATENT OFFICE.

LAWRENCE V. REDMAN, OF EVANSTON, AND ARCHIE J. WEITH AND FRANK P. BROCK, OF CHICAGO, ILLINOIS, ASSIGNORS TO REDMANOL CHEMICAL PRODUCTS COMPANY, OF CHICAGO, ILLINOIS, A CORPORATION OF WEST VIRGINIA.

CONDENSATION PRODUCT AND METHOD OF PREPARING SAME.

1,242,593.     Specification of Letters Patent.     Patented Oct. 9, 1917.

No Drawing.     Application filed June 19, 1916. Serial No. 104,495.

*To all whom it may concern:*

Be it known that we, LAWRENCE V. REDMAN, a citizen of Canada, residing at Evanston, in the county of Cook and State of Illinois, and FRANK P. BROCK and ARCHIE J. WEITH, citizens of the United States, residing at Chicago, in the county of Cook and State of Illinois, have invented a new and useful Improvement in Condensation Product and Method of Preparing Same, of which the following is a specification.

This invention relates particularly to condensation products of phenol and substances containing the methylene radical, and methods for preparing the same.

The invention is in the nature of an improvement upon the invention set forth and claimed in the patent of Lawrence V. Redman, No. 1,188,014, granted June 20, 1916.

The invention is highly desirable for producing a phenolic condensation product for use as a molding compound, or for other industrial purposes, where a transparent product is not required; and, also, the invention may be very advantageously employed in the production of a transparent compound.

The primary object is to provide a process which will enable a substance of this character to be produced on a commercial scale in an exceedingly simple and very practical manner, the process being of such character as to make readily controllable the re-actions involved, keep the mass undergoing treatment in such condition as to make it at all times readily handled, and also enable a compound of definite characteristics to be produced with the greatest certainty and under conditions presenting great practical advantages.

In accordance with the improved process, we prepare a fusible, anhydrous mass by directly combining a phenolic body, such as cresol, with an active methylene body, such as hexamethylenetetramin, by an anhydrous re-action carried on substantially in the absence of water, using an excess of the cresol, the re-action being carried on with a relatively small percentage of creosote oil present in the mixture, or the cresote oil being introduced into the fusible mass before proceeding to the final steps, which result in a compound capable of being converted to a final infusible, insoluble product; and having obtained, by this simple preliminary step, what we term an initial fusible product of a character which is peculiarly adapted to further treatment, we incorporate in or mix with the resin a substance which will furnish sufficient methylene to convert the initial product, at a proper temperature, to a final insoluble, infusible, chemically inert substance which may be termed the final product. The active methylene substance which may be introduced at this point is preferably hexamethylenetetramin; and where pigments are desired, they are usually stirred into the fluid product at the same stage at which the additional hexamethylenetetramin is introduced.

The process further involves the subsequent mixing of the potentially re-active resin, preferably after it has been cooled and comminuted, with fillers, such as asbestos, mica, flock, wood pulp, etc., and subsequent treatment to put the material into merchantable form, or in a form enabling it to be readily used as a molding compound, or for other purposes.

In accordance with the preferred method, we first obtain a fusible mass having as a large constituent a condensation product of a phenolic body and an active methylene body in the following manner:

Mix 972 pounds cresol ($(2) CH_3C_6H_4OH$), 140 pounds hexamethylenetetramin ($(CH_2)_6N_4$), 78 pounds creosote oil; heat the mixture in a vessel or still, while stirring, to a temperature of 140° C.; then turn off the heat and allow the evolution of ammonia to proceed (the temperature automatically rising); apply further heat after the rapid evolution of ammonia ceases, continuing the heat at a temperature of preferably 165° C. for forty-eight hours; pour the mass into a mixer, such as a paint-mixer, the mass being now at a temperature of from 95° C. to 120° C. and having the consistency of a stiff liquid, or taffy; add to, or stir into, the mass 120 pounds of hexamethylenetetramin; mix or stir into the mass at the same stage such quantity of dies or pigments as may be desired, and also a small amount of fats or waxes, preferably three to six per cent. by weight; and finally cool the potentially re-active resin (now containing both free cresol and free hexamethylenetetramin) in pans, comminute the material, then mix with fillers, roll the material under such conditions as to cause a certain amount of re-action and the production of sheets having the appearance of heavy tarred paper; finally allow the sheets of material to cool; then break or coarse grind in a grinding-mill, then pulverize in a beater-mill, sift and blend, thus producing a finely granulated product. This product is salable as a molding compound, and may be molded in heated molds, where conversion to the final insoluble, infusible product takes place.

The mixture, or batch, referred to above, contains cresol and hexamethylenetetramin in the proportions of about 9 mols. of cresol to 1 mol. of hexamethylenetetramin; and after the admixture of hexamethylenetetramin to the fusible mass, we have what corresponds with about 5½ mols. of cresol to 1 mol. of hexamethylenetetramin. The amount of hexamethylenetetramin added after the fusible mass is produced is approximately 10 per cent. of the weight of the original batch.

The creosote oil employed is a commercial creosote oil, preferably distilling at a temperature of approximately 220° C. to 270° C. As is known, creosote oil is a mixture of cyclic hydrocarbons, containing no readily re-active groups. Such a mixture cannot be designated by definite formula. The mixture may comprise, however, a number of cyclic hydrocarbons, such as naphthalene $(C_{10}H_8)$, anthracene $(C_{14}H_{10})$, etc. Preferably, the mixture is free from hydroxyl, chlorin, or any readily re-active group. Camphor may be used as a substitute for creosote oil.

While the use of approximately 1½ mols. of the cresol to 1 mol. of hexamethylenetetramin tends to enable the materials undergoing treatment to be kept in a desirable fluid condition during the process of manufacture, as well as to prevent the material from passing to such a stage as to prevent the production (for illustration) of the most desirable molding-compound; it may be stated that the addition of the creosote oil greatly facilitates the manufacture, enables the cresol to be combined in the first instance with a comparatively high percentage of the active methylene body, and facilitates the subsequent preparation of the potentially re-active fusible resin, and finally remains incorporated in the compound without detriment to the final product, but, on the contrary, imparting a desirable plasticity in the molding operation and a higher tenacity, both in the fusible product (when allowed to cool) and in the final product.

After the initial heating operation, the fluid is amber to dark in color; and after approximately forty-eight hours of heat treatment at approximately 165° C., the substance remains a dark amber liquid. A temperature of from 125° C. to 210° C. may be used. The length of treatment will vary, depending upon the amount of material being treated and the temperature employed.

At a temperature of 100° C., the material is a stiff liquid, or taffy, and may be pulled or stretched, like taffy, becoming lighter in color, when subject to repeated stretching.

Any suitable fat or wax may be used with a view to preventing the material from sticking in the dies. Beeswax, stearin, stearic acid, paraffin, etc., are illustrations.

For a batch such as stated, the operation of stirring in additional amount of hexamethylenetetramin necessary to give the required proportions for converting to the final infusible product and the pigments usually require about fifteen minutes, the temperature being maintained at approximately 100° C. The material is poured, after this mixing operation, in somewhat the consistency of tar, into shallow pans, and allowed to cool. After coarse breaking, if desired, the material may be more or less finely comminuted in a beater-mill. The material, being in small pieces, may be readily mixed with fillers, wood pulp, for instance, by means of any suitable mixing apparatus.

After the incorporation of the filler, it becomes desirable to partially fuse the potentially re-active resin and cause the filler-pulp, or fiber, to become virtually a part of the potentially re-active resin, and, ultimately, to secure a perfect blend of the materials, thus giving a substantial homogeneity of texture and characteristics throughout the mass of the material.

The purpose last indicated is accomplished by throwing or feeding a quantity of the dry pulp-like mixture of materials on a pair of revolving rolls, which are disposed close together and geared to operate at any desired speed. The friction created by this operation causes the materials to adhere to the rolls. Water may be circulated through the rolls to prevent excessive heat. At intervals of a few minutes, the material is cut or peeled from the roll and fed and re-fed through the rolls, which thus perform a thorough mixing and blending operation. In this operation, the heat developed is doubtless sufficient to cause some chemical re-action. It is desirable, however, to prevent the heat from becoming too great, both because too much heat interferes with the free working of the materials on the rolls.

and also because any advanced stage of reaction toward the final product is to be avoided. Usually a rolling operation of two minutes for a batch of material thrown on the rolls is sufficient to give the desired blend. The sheets of material are then cut from the rolls; cooled and passed into the grinding-mill and coarse ground; and thence through the beater-mill and finely ground, sifted and blended.

The material is now in suitable condition for use as a molding compound, and may be molded in heated molds, where conversion to the final product takes place.

Taken from the rolls as a sheet, the potentially re-active material may be rolled into uniform sheet or plate form, and may be used for various purposes. The material may be heated to plastic condition in open or closed dies, and may be cast or molded, as desired.

The material, either before or after the admixture of filler, may be used for insulating purposes. The same may be said with respect to the use of the material for molding purposes. Various other uses of the compound, either before or after the admixture of the filler, will occur to those skilled in the art.

While it is desirable to add the creosote oil to the mixture of cresol and hexamethylenetetramin prior to the initial heat treatment, one may, if desired, first produce a fusible mass, using an excess of the cresol, and then add the creosote oil while the fusible mass is in fluid condition. Proceeding in this manner, it is usually desirable to employ a somewhat larger percentage of cresol in the first instance, say 10 mols. of cresol to 1 mol. of hexamethylenetetramin. Subsequent to the elimination of the ammonia, some of the cresol, say 10 per cent. of the amount originally employed, may be removed from the mass by blowing hot air through the mass. The creosote oil may then be added or mixed with the mass while it is still in fluid condition and prior to the operation of mixing with the mass the necessary amount of hexamethylenetetramin to effect conversion to the final infusible product.

The fusible mass may be dissolved in the usual solvents, such as alkalis, acetone, or a mixture of solvents, and may be used as a lacquer or varnish. If desired, a certain percentage of hexamethylenetetramin may be incorporated in the varnish, so that where the varnish or lacquer is subjected to a subsequent heat treatment, conversion to the final infusible product will take place.

In the illustrations given, a fusible mass containing a condensation product is produced by an anhydrous re-action substantially in the absence of water, and without the use of a catalyzer. A small amount of water present in the cresol, as an impurity, would not interfere with the practice of the process. Any suitable phenolic body may be used for producing the initial product. Meta para cresol is cheap, as compared with phenol proper, and may be used with most excellent results in the process herein described. Any suitable active methylene body which will readily furnish the necessary methylene group ($CH_2$) may be used to produce the anhydrous product provided it be of an anhydrous character, or substantially so. In each instance, we employ, to effect the conversion to the final product, a substance which will readily furnish the necessary methylene ($CH_2$) to combine with the fusible product and effect conversion to the final infusible resin. The substance employed for this purpose is preferably an anhydrous active methylene body, such as hexamethylenetetramin. Where this material is employed, the comparatively small amount of ammonia present in the potentially re-active resin or mixture will act purely as an aid in expediting the re-actions which occur in converting the substance to the final state.

It will be noted as characteristic of the improved process that in the first step of the process the serious difficulties which have so long been experienced in this art by the practice of the old wet formaldehyde process with the attendant difficulties incident to the use of large quantities of water and necessary catalyzers during this stage of producing a phenolic condensation product, are entirely obviated, and the resin, with the creosote oil incorporated therein, is left in such a desirable mobile state as to render easy the succeeding steps in producing, for illustration, a molding product capable of being converted, in the molding operation, to the final infusible state. Not only so, but the method followed renders it possible to eliminate the ammonia in the easiest possible manner and to enable the condensation to be carried to a desirable advanced stage, prior to adding the fillers and the methylenes necessary to effect the final conversion. The result of the process is to produce a molding compound which can be quickly converted to the final infusible state in the molding operation, thus expediting the work of the various manufacturers who use the molding compound, which in itself is a highly desirable result. Material of this character may be molded into comparatively large pieces and converted to the final state within a period of approximately five minutes; and the molded product possesses a high tensile strength, which obviates danger of breakage. It is characteristic of the effect of creosote oil to greatly increase the tensile strength of the product.

It will be understood that the proportions of the materials may be varied somewhat; also that the steps in the process may be varied somewhat.

As has been indicated, carbolic acid, or any homologue, such as cresols or any other suitable commercially obtainable phenolic body may be used.

In the practice of the process, the ammonia evolved may be collected and used for any desired purpose. For instance, the ammonia may be discharged into a solution of formaldehyde to produce fresh hexamethylenetetramin, and this, in turn, may be used in the practice of the process.

Various variations in the details of the process are desirable, depending upon the exact character of the product desired, as will be understood from the foregoing explanation. The foregoing detailed description has been given for clearness of understanding only, and no unnecessary limitation should be understood therefrom, but the appended claims should be construed as broadly as permissible in view of the prior art.

What we regard as new and desire to secure by Letters Patent is—

1. In the process of producing a phenolic condensation product, the step which consists in mixing a phenolic body and an active methylene body in the proportions of considerably more than one phenolic group to each active methylene group of the methylene body, applying heat to produce a fusible resin, and incorporating in the fusible mass a cyclic compound having no readily re-active group.

2. In the process of producing a phenolic condensation product, the step which consists in mixing a phenolic body and an active methylene body in the proportions of considerably more than one phenolic group to each active methylene group of the methylene body, incorporating in the mixture a relatively small amount of a cyclic hydrocarbon, and subjecting the mixture to the action of heat to produce a fusible resin.

3. In the process of producing a phenolic condensation product, the step which consists in mixing a phenolic body and an active methylene body in the proportions of considerably more than one phenolic group to each active methylene group of the methylene body, incorporating in the mixture a relatively small amount of a mixture of cyclic hydrocarbon having no readily reactive groups, and subjecting the mixture to the action of heat to produce a fusible resin.

4. In the process of producing a phenolic condensation product, the step which consists in mixing a phenolic body and a methylene-amin body in the proportions of considerably more than one phenolic group to each active methylene group of the methylene body, and also mixing therewith a cyclic hydrocarbon, and subjecting said mixture to the action of heat for a prolonged period to eliminate the ammonia and produce a fusible product.

5. In the process of producing a phenolic condensation product, the step which consists in producing an anhydrous reaction, substantially in the absence of water, between a phenolic body and a methylene-amin body in the proportions of considerably more than one phenolic group to each active methylene group of the methylene body, such re-action being carried on, and the nitrogen expelled in the form of ammonia in the presence of a cyclic hydrocarbon in the mixture.

6. In the process of producing a phenolic condensation product, the step which consists in mixing a phenolic body and a methylene-amin body in proportions of considerably more than one phenolic group to each active methylene group of the methylene body, and creosote oil in relatively small proportion; and subjecting the mixture to the action of heat to expel the nitrogen in the form of ammonia.

7. In the process of producing a phenolic condensation product, the step which consists in mixing a phenolic body and a methylene-amin body in proportions of considerably more than one phenolic group to each active methylene group of the methylene body, and creosote oil in relatively small proportion; and subjecting the same to the action of heat substantially in the absence of water and causing an anhydrous re-action to produce a fusible mass.

8. In the process of producing a phenolic resin, the step which consists in mixing a phenolic body and a methylene-amin body in the proportions of substantially one and one-half mols. of the phenolic body to one mol. of the methylene-amin body, incorporating in the mixture a relatively small proportion of a cyclic hydrocarbon, and subjecting the mixture to the action of heat to eliminate the nitrogen in the form of ammonia.

9. In the process of producing a phenolic resin, the step which consists in mixing a phenolic body and hexamethylenetetramin in the proportions of substantially one and one-half mols. of the phenolic body to one mol. of the hexamethylenetetramin, incorporating in the mixture a relatively small proportion of creosote oil, and subjecting the mixture to the action of heat to eliminate nitrogen in the form of ammonia.

10. In the process of producing a phenolic condensation product, the step which consists in mixing a phenolic body and hexamethylenetetramin in the proportions of substantially one and one-half mols. of the phenolic body to one mol. of hexamethylenetetramin, incorporating in the mixture creosote oil in amount approximating one-half the weight of the hexamethylenetetramin, and subjecting the mixture to the action of heat to cause elimination of the nitrogen.

11. The process of producing a potentially re-active condensation compound, which consists in combining a methylene-amin body with a phenolic body in the presence of a cyclic hydrocarbon, the materials being used in the proportions of considerably more than one phenolic group of the phenolic body to one methylene group of the methylene-amin body; subjecting the mixture to the action of heat to cause elimination of nitrogen; and then incorporating in the resin a substance containing active methylene in sufficient quantity to effect conversion of the compound to a final insoluble infusible state.

12. The process of producing a potentially re-active condensation compound, which consists in combining a methylene-amin body with a phenolic body in the presence of a cyclic hydrocarbon, the materials being used in the proportions of considerably more than one phenolic group of the phenolic body to one methylene group of the methylene-amin body; subjecting the mixture to the action of heat to cause elimination of nitrogen; and then incorporating a filler and a substance containing methylene in sufficient quantity to effect conversion of the compound to a final insoluble, infusible state.

13. The process of producing a potentially re-active phenolic condensation compound, which consists in combining hexamethylenetetramin with a phenolic body by an anhydrous re-action in substantially the absence of water and in the presence of a cyclic hydrocarbon, the materials being used in the proportions of considerably more than one phenolic group to one methylene group, the substance being initially heated to a degree sufficient to cause automatic heating of the mass to take place and sufficient heat being applied to cause the elimination of the nitrogen in the form of ammonia; and then introducing a filler and a substance containing methylene in sufficient quantity to effect conversion, under the application of heat, to the final insoluble, infusible state.

14. The process of producing a potentially re-active fusible compound, which consists in combining a methylene-amin body with a phenolic body, by an anhydrous re-action in substantially the absence of water and in the presence of creosote oil, the materials being used in the proportions of considerably more than one phenolic group of the phenolic body to one methylene group of the methylene-amin body, the mixture being initially subjected to such heat treatment as to cause the expulsion of the nitrogen in the form of ammonia; then incorporating in the fusible resin thus produced a substance containing methylene in sufficient quantity to effect conversion of the compound to the final insoluble, infusible state, under the application of further heat.

15. The process of producing a potentially re-active fusible compound, which consists in combining a methylene-amin body with a phenolic body, by an anhydrous re-action in substantially the absence of water and in the presence of creosote oil, the materials being used in the proportions of considerably more than one phenolic group of the phenolic body to one methylene group of the methylene-amin body, the mixture being initially subjected to such heat treatment as to cause the expulsion of the nitrogen in the form of ammonia; then introducing into the fusible mass a filler and a substance containing methylene in sufficient quantity to effect conversion of the resin to a final insoluble, infusible condition, under the application of heat.

16. The process of producing a potentially re-active phenolic condensation product, which consists in combining a methylene-amin body with a phenolic body by an anhydrous re-action in substantially the absence of water and in the presence of a relatively small proportion of a cyclic hydrocarbon, the mixture of materials being subjected to the action of heat to eliminate the nitrogen in the form of ammonia; then incorporating in the fusible mass a substance containing methylene in sufficient quantity to effect conversion to a final insoluble infusible state; then cooling and comminuting the potentially re-active resin.

17. The process of producing a potentially re-active phenolic condensation product, which consists in combining a methylene-amin body with a phenolic body by an anhydrous re-action in substantially the absence of water and in the presence of a relatively small proportion of a cyclic hydrocarbon, the mixture of materials being subjected to the action of heat to eliminate the nitrogen in the form of ammonia; then incorporating in the fusible mass a substance containing methylene in sufficient quantity to effect conversion to a final insoluble, infusible state; then cooling and comminuting the potentially re-active resin, introducing a filler, and subjecting to mechanical treatment to fuse the resin and incorporate the filler as a constituent part of a body formed of the materials.

18. The process of producing a potentially re-active phenolic condensation compound, which consists in combining a methylene body with a phenolic body in the presence of a cyclic hydrocarbon, the materials being used in the proportions of considerably more than one phenolic group of the phenolic body to one methylene group of the methylene body, and the cyclic hydrocarbon being used in relatively small proportion, the substance being subjected to the action of heat to produce a fusible resin; then introducing a substance containing methylene in sufficient quantity to effect conversion of the fusible mass to the final insoluble, infusible state; then cooling and comminuting the mass; then mixing with the comminuted mass a filler; and then subjecting the mass to mechanical action under a fusing temperature and effecting blending and incorporation of the filler as an integral portion of the fusible body.

19. The process of producing a potentially re-active phenolic condensation compound, which consists in combining a methylene body with a phenolic body in the presence of a cyclic hydrocarbon, the materials being used in the proportions of considerably more than one phenolic group of the phenolic body to one methylene group of the methylene body, and the cyclic hydrocarbon being used in relatively small proportion, the substance being subjected to the action of heat to produce a fusible, potentially reactive resin; then introducing a substance containing methylene in sufficient quantity to effect conversion of the fusible mass to the final insoluble, infusible state; then cooling and comminuting the mass; then mixing with the comminuted mass a filler; then subjecting the mass to mechanical action under a fusing temperature and effecting blending and incorporation of the filler as an integral portion of the fusible body; and finely comminuting the mass and sifting the comminuted materials, thus attaining a granular, potentially re-active product.

20. The process of producing a potentially re-active compound, which consists in combining a methylene-amin body with a phenolic body by an anhydrous re-action in substantially the absence of water and in the presence of a relatively small proportion of creosote oil, the phenolic body and methylene-amin body being used in the proportions of substantially one and one-half phenolic groups to one methylene group, the substance being subjected to the action of heat to eliminate the nitrogen; incorporating in the fusible mass thus produced a substance containing methylene in sufficient quantity to effect conversion to a final insoluble, infusible state; cooling and comminuting the mass, and introducing a filler; then fusing and blending the mass.

21. The process of producing a potentially re-active compound, which consists in combining a methylene-amin body with a phenolic body by an anhydrous re-action in substantially the absence of water and in the presence of a relatively small proportion of creosote oil, the phenolic body and methylene-amin body being used in the proportions of substantially one and one-half phenolic groups to one methylene group, the substance being subjected to the action of heat to eliminate the nitrogen; incorporating in the fusible mass thus produced a substance containing methylene in sufficient quantity to effect conversion to a final insoluble, infusible state; cooling and comminuting the mass and introducing a filler; fusing and blending the mass; then comminuting the material thus produced.

22. The process of producing a potentially re-active phenolic condensation product, which consists in combining hexamethylenetetramin with a phenolic body by an anhydrous re-action in substantially the absence of water and in the presence of a relatively small proportion of a cyclic compound, the phenolic body and hexamethylenetetramin being used in the proportions of substantially one and one-half phenolic groups to one methylene group, the mixture being subjected to the action of heat to eliminate nitrogen; then incorporating in the fusible mass thus produced a methylene-amin body containing methylene in sufficient quantity to effect conversion to a final infusible state; then mechanically fusing and blending the materials.

23. In the process of producing a potentially re-active phenolic condensation product, the step which consists in mixing with a fusible phenolic condensation product containing an excess of phenolic body, a substance containing methylene in sufficient quantity to effect conversion to an infusible state; then cooling and comminuting the mass; then incorporating a filler; then subjecting the mass to the action of rolls to mechanically fuse and blend the mass.

24. In the process of producing a potentially re-active phenolic condensation product, the step which consists in mixing a fusible phenolic condensation product containing an excess of phenolic body and a relatively small percentage of a cyclic compound, a substance containing methylene in sufficient quantity to effect conversion to an infusible state; then cooling and comminuting the mass; then subjecting the mass to the action of rolls to mechanically fuse and blend the mass.

25. As a new composition of matter, the fusible anhydrous resinous condensation product containing a high percentage of free phenolic body and a cyclic compound having no readily re-active groups, said composition produced by combining in an anhydrous re-action substantially in the absence of water an active methylene body and a phenolic body in proportions furnishing considerably more than one phenolic group to one active methylene group, and incorporating in the mass a relatively small proportion by weight of said mixture of cyclic hydrocarbons.

26. As a new composition of matter, the fusible, anhydrous resinous condensation product produced by combining in an anhydrous re-action, substantially in the absence of water, a methylene-amin body and a phenolic body in proportions furnishing substantially one and one-half phenolic groups to one active methylene group, such re-action carried on in the presence of a relatively small proportion by weight of a cyclic hydrocarbon in the mixture.

27. As a new composition of matter, a potentially re-active fusible phenolic condensation product, produced by combining a phenolic body and an active methylene body in proportions of substantially one and one-half phenolic groups to one methylene group, incorporating creosote oil in the compound, subsequently mixing with the compound a methylene substance containing sufficient methylene to effect conversion to a final infusible state; then cooling and comminuting the mass.

28. As a new composition of matter, a potentially re-active fusible phenolic condensation product, produced by combining a phenolic body and an active methylene body in proportions of substantially one and one-half phenolic groups to one methylene group, incorporating creosote oil in the compound; subsequently mixing with the compound a methylene substance containing sufficient methylene to effect conversion to a final infusible state; cooling and comminuting the mass; then mixing a filler with the comminuted mass; and then fusing and blending, without converting to the final infusible state.

29. A molded product comprising a condensation product, produced by anhydrous reaction between a substantially anhydrous methylene body and a substantially anhydrous phenolic body and having incorporated therein a cyclic hydrocarbon having no readily re-active group.

30. A molded product comprising a phenolic condensation product, produced by anhydrous reaction between a methylene-amin body and a substantially anhydrous phenolic body and having incorporated therein a cyclic hydrocarbon in relatively small proportions and possessing no readily re-active group.

31. A molded product comprising a phenolic condensation product, produced by anhydrous reaction between a methylene-amin body and a substantially anhydrous phenolic body and having incorporated therein a mixture of cyclic hydrocarbons having no readily re-active group.

32. A molded product comprising a phenolic condensation product having incorporated therein a relatively small proportion of creosote oil.

33. A molded product comprising a phenolic condensation product having incorporated therein a filler and a relatively small proportion of creosote oil.

LAWRENCE V. REDMAN.
ARCHIE J. WEITH.
FRANK P. BROCK.